United States Patent
Chung et al.

(10) Patent No.: US 11,003,449 B2
(45) Date of Patent: May 11, 2021

(54) PROCESSING DEVICE AND A SWIZZLE PATTERN GENERATOR

(71) Applicant: Samsung Electronics Co., Ltd., Suwon-si (KR)

(72) Inventors: Moo-Kyoung Chung, Yongin-si (KR); Woong Seo, Hwaseong-si (KR); Ho-Young Kim, Seoul (KR); Soo-Jung Ryu, Hwaseong-si (KR); Dong-Hoon Yoo, Seoul (KR); Jin-Seok Lee, Seoul (KR); Yeon-Gon Cho, Hwaseong-si (KR); Chang-Moo Kim, Seoul (KR); Seung-Hun Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 16/256,266

(22) Filed: Jan. 24, 2019

(65) Prior Publication Data

US 2019/0155601 A1    May 23, 2019

Related U.S. Application Data

(62) Division of application No. 13/618,309, filed on Sep. 14, 2012, now abandoned.

(30) Foreign Application Priority Data

Sep. 14, 2011    (KR) .......................... 10-2011-0092604

(51) Int. Cl.
*G06F 9/30* (2018.01)

(52) U.S. Cl.
CPC ...... *G06F 9/30032* (2013.01); *G06F 9/30036* (2013.01)

(58) Field of Classification Search
None
See application file for complete search history.

(56) References Cited

U.S. PATENT DOCUMENTS

| | | | |
|---|---|---|---|
| 7,681,187 B2 | 3/2010 | Ludwig et al. | |
| 7,809,931 B2 | 10/2010 | Raubuch | |
| 8,356,160 B2 * | 1/2013 | Muff | G06F 7/22 712/7 |
| 9,141,386 B2 * | 9/2015 | Wiedemeier | G06F 9/30029 |

(Continued)

FOREIGN PATENT DOCUMENTS

| | | |
|---|---|---|
| JP | 2002-149400 A | 5/2002 |
| JP | 2006-504165 A | 2/2006 |

(Continued)

OTHER PUBLICATIONS

"Multiplexer Tutorial" from Electronics Tutorials, Aug. 6, 2011. (Year: 2011).*

(Continued)

*Primary Examiner* — Steven G Synder
(74) *Attorney, Agent, or Firm* — NSIP Law

(57) ABSTRACT

A swizzle pattern generator is provided to reduce an overhead due to execution of a swizzle instruction in vector processing. The swizzle pattern generator is configured to provide swizzle patterns with respect to data sets of at least one vector register or vector processing unit. The swizzle pattern generator may be reconfigurable to generate various swizzle patterns for different vector operations.

12 Claims, 12 Drawing Sheets

(56) References Cited

U.S. PATENT DOCUMENTS

| | | |
|---|---|---|
| 2002/0026570 A1 | 2/2002 | Shimizu et al. |
| 2003/0167460 A1 | 9/2003 | Desai et al. |
| 2004/0263519 A1 | 12/2004 | Andrews et al. |
| 2005/0223196 A1 | 10/2005 | Knowles |
| 2006/0015703 A1 | 1/2006 | Ramchandran et al. |
| 2006/0015705 A1 | 1/2006 | Raubuch |
| 2006/0227966 A1* | 10/2006 | Knowles ............. G06F 9/30043 380/42 |
| 2007/0226469 A1 | 9/2007 | Wilson et al. |
| 2008/0126745 A1* | 5/2008 | Mejdrich ................ G06T 1/20 712/4 |
| 2008/0148029 A1* | 6/2008 | Luc .................... G06F 9/30032 712/300 |
| 2008/0282070 A1 | 11/2008 | Uchiyama |
| 2009/0228681 A1 | 9/2009 | Mejdrich et al. |
| 2009/0228682 A1 | 9/2009 | Mejdrich et al. |
| 2010/0106940 A1 | 4/2010 | Muff et al. |
| 2010/0332792 A1* | 12/2010 | Clifton .................. G06F 9/3826 712/4 |
| 2011/0153925 A1 | 6/2011 | Bains et al. |
| 2011/0185150 A1 | 7/2011 | Spracklen |
| 2012/0069013 A1 | 3/2012 | Takemura |
| 2012/0079233 A1* | 3/2012 | Wiedemeier ........ G06F 9/30032 712/7 |
| 2013/0067203 A1* | 3/2013 | Chung ................ G06F 9/30036 712/222 |
| 2019/0155601 A1* | 5/2019 | Chung ................ G06F 9/30032 |
| 2020/0110607 A1* | 4/2020 | Croxford ............. G06F 9/3877 |

FOREIGN PATENT DOCUMENTS

| | | |
|---|---|---|
| JP | 2008-108220 A | 5/2008 |
| JP | 2009-529188 A | 8/2009 |
| JP | 2010-250625 A | 11/2010 |
| KR | 10-0831472 B1 | 5/2006 |
| KR | 10-2007-0022239 A | 2/2007 |
| WO | WO 2005/006183 A2 | 1/2005 |

OTHER PUBLICATIONS

Raghavan, P., et al., "A Customized Cross-Bar for Data-Shuffling in Domain-Specific SIMD Processors", *International Conference on Architecture of Computing Systems*, 2007, pp. 57-68 (12 pages in English).

Woh, Mark, et al., "AnySP: anytime anywhere anyway signal processing", *ACM SIGARCH Computer Architecture News*, 2009, pp. 128-139, vol. 37, No. 3 (11 pages in English).

Woh, Mark, et al., "Mobile Supercomputers for the Next-Generation Cell Phone", *Embedded Computing*, Jan. 2010, pp. 81-85 (5 pages in English).

International Search Report and Written Opinion of the International Searching Authority issued in counterpart International Application No. PCT/KR2012/007344 dated Jan. 31, 2013 (8 pages in English).

Extended European Search Report dated Sep. 3, 2015 in corresponding European Application No. 12831412.7.

Japanese Office Action dated Mar. 7, 2016 in corresponding Japanese Application No. 2014-530590.

Japanese Office Action dated Dec. 5, 2017 in corresponding Japanese Patent Application No. 2014-5305930 (6 pages in English, 5 pages in Japanese).

* cited by examiner

FIG. 2A

| | Vector Registers | | | | | Swizzled Registers | | | |
|---|---|---|---|---|---|---|---|---|---|
| vr0 | a3 | a2 | a1 | a0 | svr0 | a3 | a3 | a2 | a2 |
| vr1 | b3 | b2 | b1 | b0 | svr1 | a3 | a2 | a1 | a0 |
| vr2 | c3 | c2 | c1 | c0 | svr2 | b1 | b3 | b0 | b0 |
| vr3 | d3 | d2 | d1 | d0 | svr3 | b3 | b3 | b2 | b2 |
| | | | | | svr4 | b1 | b0 | b3 | b2 |
| | | | | | svr5 | c3 | c3 | c3 | c3 |
| | | | | | svr6 | d1 | d2 | d3 | d0 |
| | | | | | svr7 | d0 | d3 | d2 | d1 |

FIG. 2B

| | Vector Registers | | | | | | Swizzled Registers | | | |
|---|---|---|---|---|---|---|---|---|---|---|
| vr0 | a3 | a2 | a1 | a0 | | svr0 | a3 | a3 | b1 | b1 |
| vr1 | b3 | b2 | b1 | b0 | | svr1 | a0 | a1 | b0 | b2 |
| vr2 | c3 | c2 | c1 | c0 | | svr2 | a2 | a1 | a0 | b3 |
| vr3 | d3 | d2 | d1 | d0 | | svr3 | b0 | a0 | b1 | a1 |
| | | | | | | svr4 | b2 | a2 | b3 | a3 |
| | | | | | | svr5 | a0 | b0 | c0 | d0 |
| | | | | | | svr6 | a0 | b1 | c2 | d3 |
| | | | | | | svr7 | d3 | c2 | b1 | a0 |

PROCESSING DEVICE AND A SWIZZLE PATTERN GENERATOR

CROSS-REFERENCE TO RELATED APPLICATION(S)

This application is divisional application of U.S. patent application Ser. No. 13/618,309, filed on Sep. 14, 2012, which claims the benefit under 35 U.S.C. § 119(a) of Korean Patent Application No. 10-2011-0092604, filed on Sep. 14, 2011, in the Korean Intellectual Property Office, the entire disclosure of which is incorporated herein by reference for all purposes.

BACKGROUND

1. Field

The following description relates to processing devices and swizzle instructions for vector operations.

2. Description of the Related Art

In recent years, processing data loads have drastically increased in many different fields, such as, multimedia, communication, and graphic applications to name but a few. Such an increase in data processing loads has had a significant effect on the performance of any number of processing devices, such as high-performance server computers, general personal computers (PCs), and even mobile devices. Typically, a processing device is required to process as much data as possible within a limited amount of time. As a result, many state-of-art processors increase the width of data processed at one time to satisfy this demand. One example, of such a processing device is a single instruction multiple data (SIMD) processor also known as a vector processor.

SIMD and vector processors excel at data processing since these processors concurrently operate on multiple data sets. When performing a vector or SIMD operation (herein after simply referred to as a "vector operation"), pieces of vector data or vector data elements are placed in a desired order. For example, a data set for a corresponding vector operation is placed in a specific vector register related to a vector processing unit performing the operation. To produce the data set, a plurality of scalar data is collected and stored as data elements in the vector register. When the data set is transferred between vector operations, data elements of the data set are rearranged in an appropriate order. In addition, data elements are also placed in an appropriate order when storing the result of the vector operation in a scalar form. In one example, a swizzle instruction is used to order or rearrange data elements of a data set for a related vector operation.

A swizzle instruction arranges a data set that has been read as input for a vector operation. Swizzle instructions also may be interposed between various instructions of vector operations. For example, the swizzle instruction may be interposed between a load instruction and a vector operation instruction to arrange data elements of a data set corresponding to the vector operation. In addition, a swizzle instruction may be interposed between vector operation instructions to rearrange the data set and allow the result of the preceding vector operation to be used by the subsequent vector operation. Moreover, a swizzle instruction may be interposed between a vector operation instruction and a store instruction to rearrange the data set and transfer the rearranged data set for output from the vector operation.

However, when a swizzle instruction is interposed between other instructions, such as a load instruction, a vector instruction, and a store instruction the performance of a processor executing the instructions may be degraded. In some cases, one or more swizzle instructions are interposed between all load, store, and vector operation instructions of the vector operation. As a result, processor performance can be significantly degraded.

SUMMARY

In another general aspect, a processing device comprises: a vector register configured to store a data set including data elements of a vector operation; a vector processing unit configured to perform the vector operation; and a swizzle pattern generator connected to the vector register and the vector processing unit configured to create a swizzle pattern with respect to the data set.

The swizzle pattern generator may be further configured to combine or change the order of the data elements of the data set to create the swizzle pattern.

The processing device may further include another vector register configured to store another data set including other data elements of the vector operation wherein the swizzle pattern generator is further connected to the another vector register and configured to combine the data elements of the data set and the other data elements of the another data set to create the swizzle pattern.

The processing device may further include another vector register configured to store another data set including other data elements of the vector operation wherein the swizzle pattern generator is further connected to the another vector register and configured to combine the data elements of the data set and the other data elements of the another data set to create the swizzle pattern and another swizzle pattern. The swizzle pattern may be input to the vector processor as a data set for the vector operation.

The swizzle pattern generator may include a swizzling network configured to create the swizzle pattern. The swizzling network may include a plurality of data lines configured to create the swizzle pattern, each data line having one end connected to an output of the vector register and another end connected to an input of the vector processing unit. Similarly, the swizzling network may include a plurality of data lines configured to create the swizzle pattern, each data line having one end connected to an output of the vector processing unit.

The swizzle pattern generator also may include a swizzled register configured to store the swizzle pattern.

In addition, the swizzling network may include a plurality of data lines configured to create the swizzle pattern, each data line including an end connected to an output of the vector processing unit and another end connected to an input of the swizzled register. Similarly, the swizzling network may include a plurality of data lines configured to create the swizzle pattern, each data line including an end connected to an output of the vector register and another end connected to an input of the swizzled register.

The swizzling network may include a plurality of data lines that are reconfigurable to create various swizzle patterns. For example, the swizzling network may include a switch including reconfigurable connections for each of the plurality of data lines configured to generate the various swizzle patterns based on the reconfigurable connections; and a switching table connected to the switch configured to store various switch connections for the reconfigurable connections for the plurality of data lines corresponding to the various swizzle patterns.

The swizzle pattern generator may be further configured to create the swizzle pattern substantially, simultaneously upon output of the data set from the vector register. Similarly, the swizzle pattern generator may be further configured to create the swizzle pattern substantially, simultaneously upon input of the data set to the vector register.

In another general aspect, a processing device comprises: a vector register configured to store a data set related to a vector operation; a vector processing unit configured to perform the vector operation; and a swizzle pattern generator connected to an output of the vector register and an input of the vector processing unit configured to combined or change an order of data elements of the data set to create a swizzle pattern as an input for the vector operation.

Another vector register may be configured to store another data set related to the vector operation, wherein the swizzle pattern generator is further connected to an output of the another vector register and is further configured to combined or change an order of data elements of the data set and the another data set to create the swizzle pattern and another second swizzle pattern as an input for the vector operation.

In another general aspect, a processing device comprises: a vector processing unit configured to perform a vector operation; a vector register configured to store a data set corresponding to a vector operation result received from the vector processing unit; a swizzling network connected to an output of the vector processing unit configured to combined or change an order of data elements of the data set to create a swizzle pattern simultaneously with storing the data set in the vector register; and a swizzled register connected to the swizzling network configured to stored the swizzle pattern.

Another vector register may be configured to store another data set corresponding to the vector operation result received from the vector processing unit and another swizzled register may be configured to store another swizzle pattern, wherein the swizzle pattern generator is further configured to combined or change an order of data elements of the data set and the another data set to create the swizzle pattern and the another second swizzle pattern.

In another general aspect, a swizzle pattern generating apparatus comprises: a first data end;

a second data end connected to an output of at least one vector register or a vector processing unit; and a swizzling network including a plurality of data connections connected to the first data end and the second data end and configured to generate swizzle patterns based on the plurality of data connections at the first data end with respect to data sets output from the at least one vector register or the vector processor.

The plurality of data connections of the swizzling network may be reconfigurable to generate various arrangements of data connections and to generate various swizzle patterns corresponding to the various arrangements of data connections.

The swizzling network may include: a reconfigurable switch configured to make the plurality of data connections from the first end to the second end to generate various swizzle patterns based on an arrangement of the data connections; and a switching table connected to the switch configured to store various arrangements of data connections from the first end to the second end for the reconfigurable switch corresponding to the various swizzle patterns.

At least one swizzled register may be connected to the first end and configured to store data elements in an order corresponding to the swizzle patterns. Similarly, at least one swizzled register connected to the first end and configured to store data elements in an order corresponding to the various swizzle patterns.

The data elements output from the swizzling network at the first end may provide at least one virtual swizzled register and swizzle patterns corresponding to an arrangement of the output data elements.

Other features and aspects may be apparent from the following detailed description, the drawings, and the claims.

BRIEF DESCRIPTION OF THE DRAWINGS

FIG. 2A is a diagram illustrating examples of swizzle patterns.

FIG. 2B is a diagram illustrating other examples swizzle patterns.

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
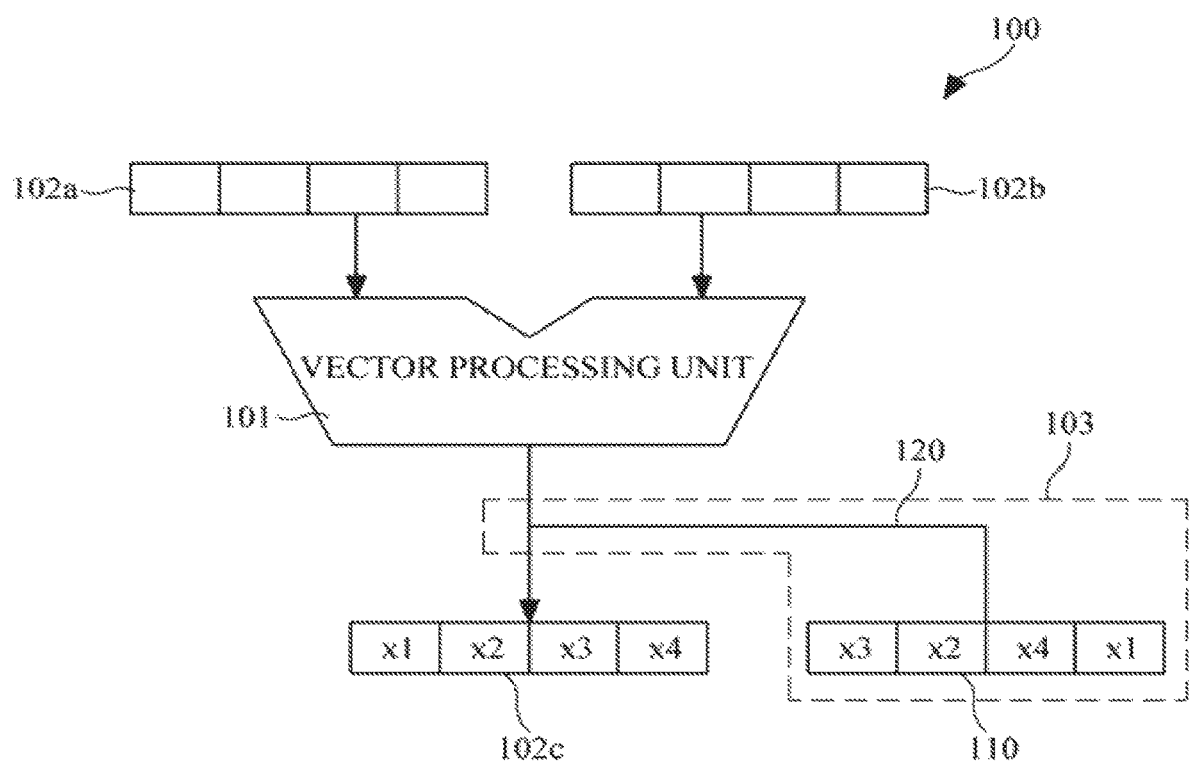
FIG. 1 is a diagram illustrating an example of a processing device.

FIG. 1 illustrates an example of a processing device 100. The processor device 100 may be implemented, for example, using a processor equipped with a single core, a processor equipped with multiple cores, a reconfigurable coarse grained array (CGA) machine or a very long instruction word (VLIW) machine.

Referring to FIG. 1, the processing device 100 includes a vector processing unit 101, a plurality of vector registers (e.g., vector registers 102a, 102b, and 102c), and a swizzle pattern generator 103.

The vector processing unit 101 performs vector operations. For example, the vector processing unit 101 calculates the sum or product of input vectors and provides a result.

Each of the plurality of vector registers (e.g., 102a, 102b, and 102c) stores a data set comprising a number of data elements that are related to a vector operation (i.e., vector data). For example, the data set may include a plurality of scalar data arranged as data elements.

Figure 3:
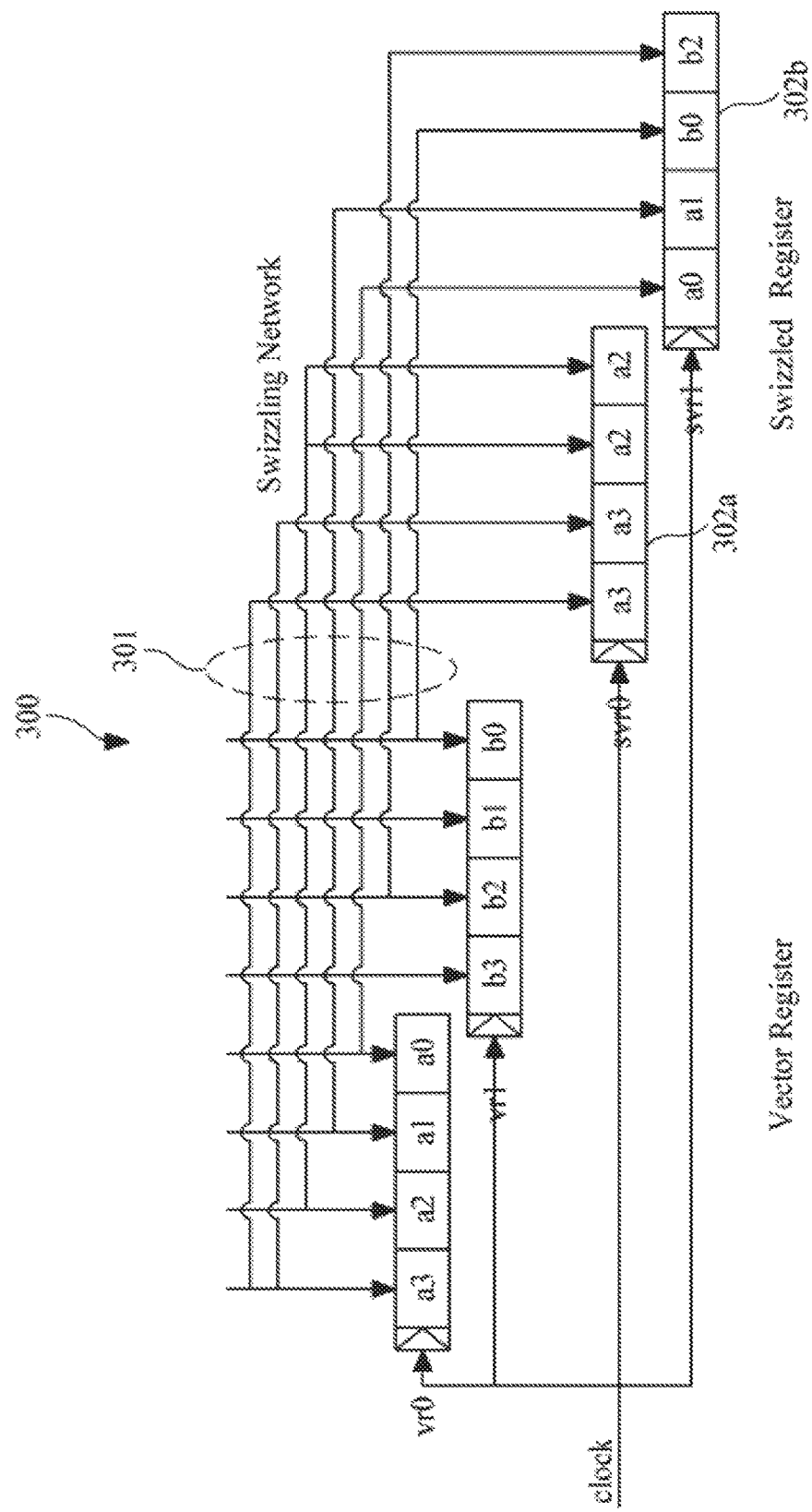
FIG. 3 is a diagram illustrating an example of a swizzle pattern generator.
Figure 4:
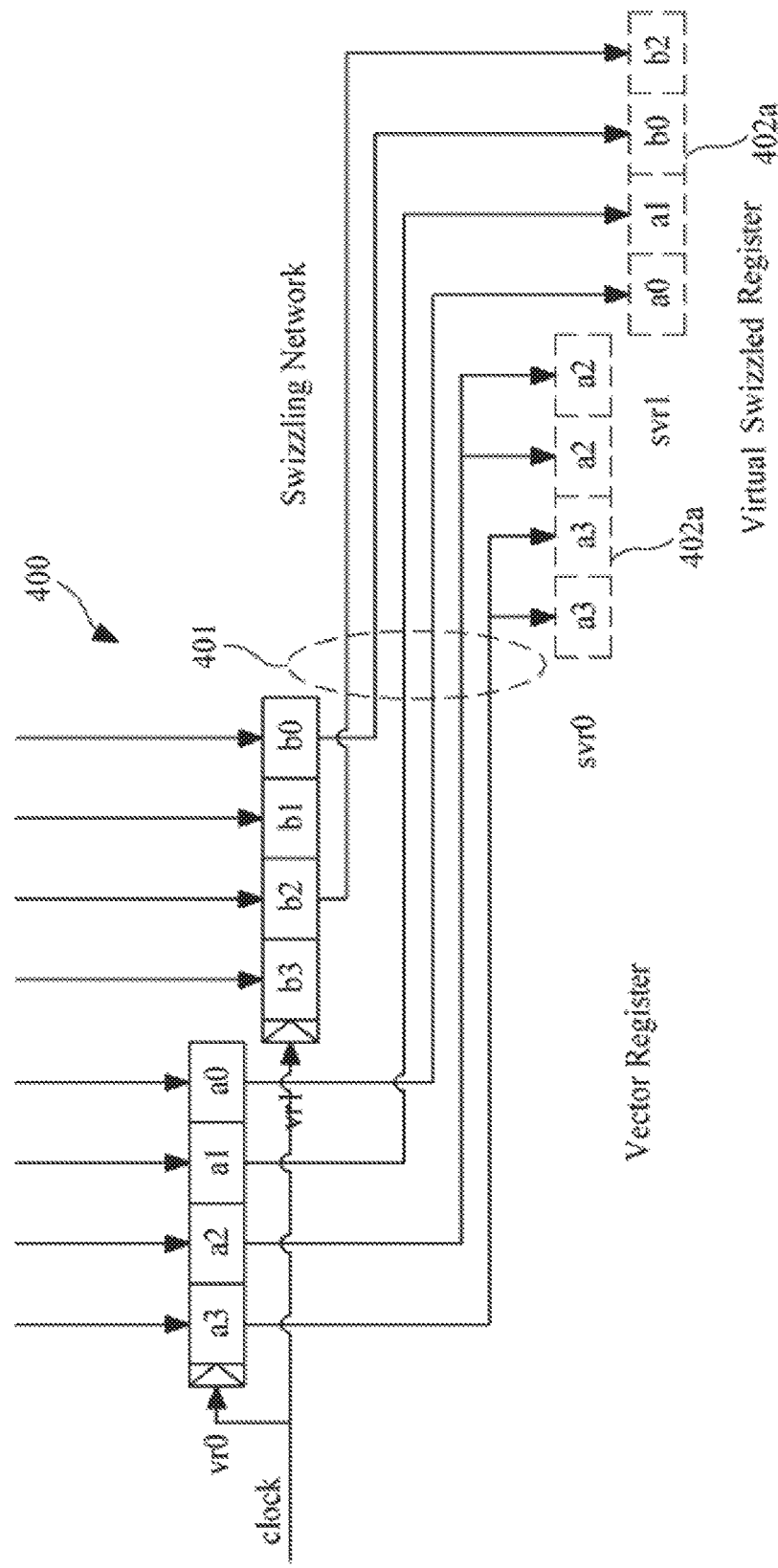
FIG. 4 is a diagram illustrating another example of a swizzle pattern generator.

The swizzle pattern generator 103 may create a swizzle pattern with respect to the data set stored by vector register 102c. A swizzle pattern is the result of arranging the data elements of at least one data set in a desired order. For example, the swizzle pattern may be obtained by combining or changing the order of the data elements in a data set of at least one vector register (e.g., the vector register 102c). The swizzle pattern also may be obtained by combining the data elements of a data set stored in a first vector register and the data elements of a data set stored in a second vector register (e.g., as shown in FIGS. 3 and 4, and described in further detail below). The swizzle pattern generated by the swizzle pattern generator 103 for one or more data set may be the same as or equivalent to the swizzle pattern the result from executing a swizzle instruction on the one or more of the data sets. However, the swizzle pattern generator 103 provides substantially the same result (i.e., a swizzle pattern) as executing a swizzle instruction on the one or more data sets without actually executing a swizzle instruction. As result, overhead associated with executing the swizzle instruction is reduced or eliminated thereby improving overall processing performance.

In one example, the swizzle pattern generator 103 includes a swizzled register 110 and a swizzling network 120. The swizzled register 110 may be a physical vector register as shown in FIG. 1, for example, a register having the same properties as vector registers 102a, 102b, and 102c, or the swizzled register 110 may be a virtual register that does not utilize an actual storage device (as described in further detail below). As shown in FIG. 1, the swizzled register 110 is a physical or virtual vector register that stores/provides a swizzle pattern related to one or more related vector registers (e.g., vector register 102c).

The swizzling network 120 includes a plurality of wires or data lines. Each wire or data line has at least two ends. In one example, as shown in FIG. 1, one end of the wire or data line is connected to an input of the vector register 102c and another end is connected to the swizzled register 110. The swizzling network 120 facilitates generation of the various swizzle patterns, and the generated swizzle patterns may be stored by the swizzled register 110. For example, when data elements (e.g., x1, x2, x3, and x4) are input to the vector register 102c having an order of x1, x2, x3, x4, upon inputting the data elements to the vector register, a swizzle pattern (e.g., a data set arranged in the order of x3, x2, x4, x1) may be generated by the swizzling network 120 (as described in further detail below) and stored by the swizzled register 110.

Figure 6:
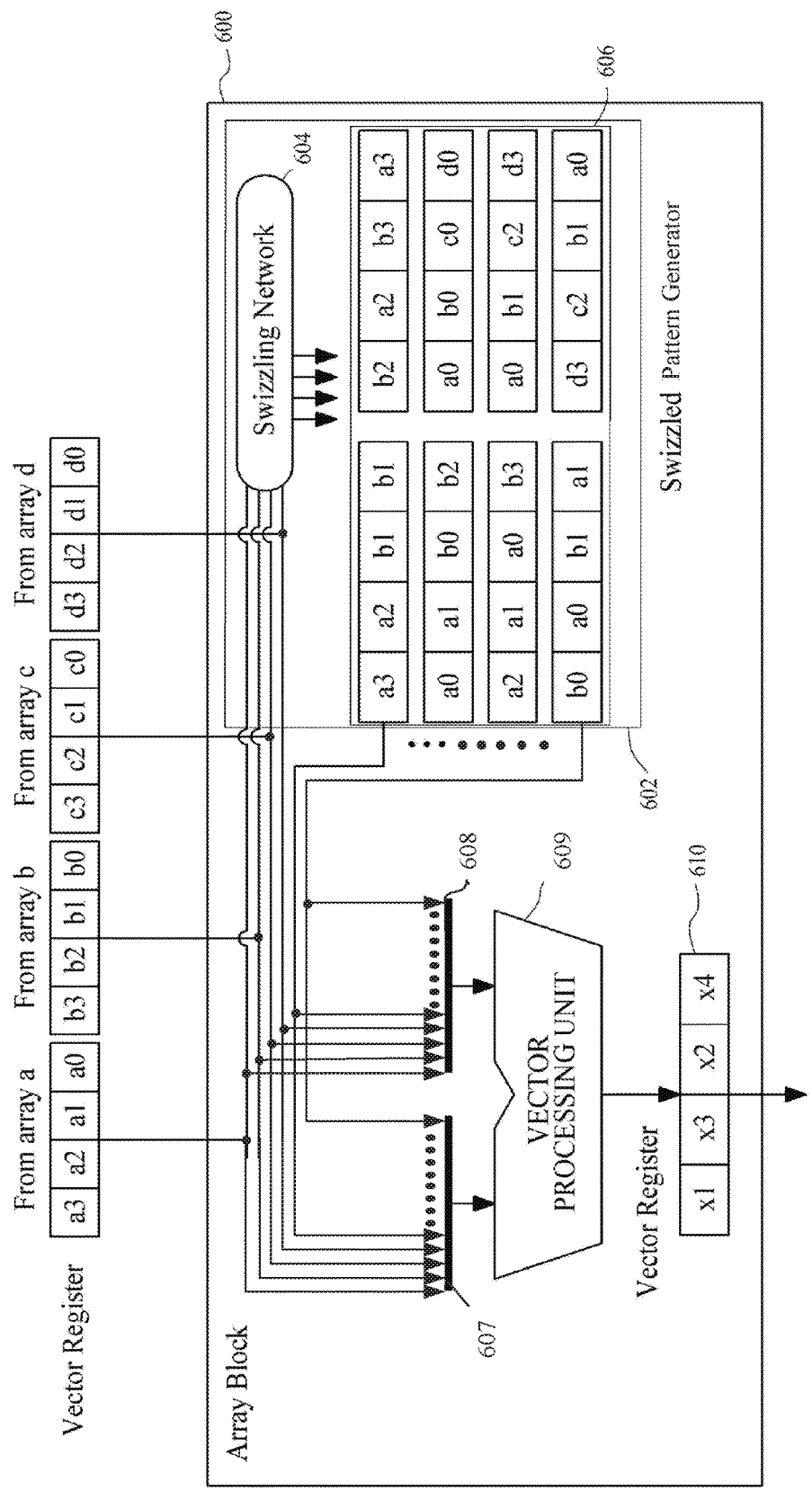
FIG. 6 is a diagram illustrating an example of a processing device applied to a coarse grained array (CGA).

FIG. 1 illustrates the swizzling network 120 connected to an input of the vector register 102c. However, this is only one example of an embodiment of a swizzling network. For example, an output of a vector register and another end connected to the swizzled register (e.g., as shown in FIG. 6 and in further detail below). In addition, FIG. 1 illustrates that the swizzle pattern generated with respect to the single data set stored in the vector register 102c. However, this is only one example, and a swizzle pattern generated by combining data elements from two or more vector registers also may be stored in the swizzled register (e.g., as shown in FIG. 3 and in further detail below).

FIGS. 2A and 2B illustrate examples of swizzle patterns. The swizzle patterns illustrated in FIG. 2A may be generated based on a data set of a given vector register.

Referring to FIG. 2A, each of the vector registers (e.g., vr0, vr1, vr2, vr3) stores a vector data set (e.g., {a3, a2, a1, a0}, {b3, b2, b1, b0}, {c3, c2, c1, c0}, and {d3, d2, d1, d0}). In this example, each vector data set includes four data elements. Each of the swizzled registers (e.g., svr0, svr1, svr2, svr3, svr4, svr5, svr6, and svr7) stores a swizzle pattern with respect to the data set of a corresponding vector register. In other words, the swizzled registers store a result obtained by combining data elements of one vector register or a result obtained by altering the order of data elements of one vector register.

For example, the swizzled register svr0 stores a swizzle pattern "a3, a3, a2, a2" with respect to the data set {a3, a2, a1, a0} of vector register vr0. In this example, the swizzle pattern "a3, a3, a2, a2" stored by swizzled register svr0 is obtained by combining the data element a3 and the data element a2 of the vector data set {a3, a2, a1, a0} stored by the vector register vr0.

FIG. 2B illustrates other examples of swizzle patterns. The swizzle patterns illustrated in FIG. 2B are generated based on a data set of a plurality of vector registers.

Referring to FIG. 2B, each of the vector registers (e.g., vr0, vr1, vr2, vr3) stores a vector data set (e.g., {a3, a2, a1, a0}, {b3, b2, b1, b0}, {c3, c2, c1, c0}, and {d3, d2, d1, d0}). In this example, each vector data set includes four data elements. Each of the swizzled registers (e.g., svr0, svr1, svr2, svr3, svr4, svr5, svr6, and svr7) stores a swizzle pattern with respect to the data sets of a plurality of the vector registers. In other words, each swizzled register stores a result obtained by combining data elements from of a plurality of data sets stored by a number of vector registers.

For example, a swizzled register svr0 stores a swizzle pattern (e.g., a3, a3, b1, b1) with respect to the data set {a3, a2, a1, a0} stored by vector register vr0 and the data set {b3, b2, b1, b0} stored by vector register vr1. In this example, the swizzle pattern "a3, a3, b1, b1" stored by the swizzled register is obtained by combining a data element a3 of the vector register vr0 and a data element b1 of the vector register vr1.

Of course, the swizzle patterns illustrated in FIGS. 2A and 2B are only some of the possible examples of possible swizzle patterns. In addition, a swizzle pattern may be defined according to a type of a running application. In addition, a predetermined number of swizzle patterns may be used.

FIG. 3 illustrates another example of a swizzle pattern generator. The swizzle pattern generator illustrated in FIG. 3 utilizes a physical storage device. Referring to FIG. 3, the swizzle pattern generator 300 includes a swizzling network 301 and a swizzle pattern storage device 302, such as swizzled registers 302a and 302b.

The swizzling network 301 includes a plurality of data lines or wires having at least two ends. One end of each wire is connected to an input of a vector register and another end of the wire is connected to at least one of the swizzled registers 302a and 302b to create a predetermined swizzle pattern based on the connections.

The swizzled registers 302a and 302b may be vector registers that are physically the same type of register as vector registers vr0 and vr1. For example, the swizzled registers 302a and 302b may be implemented using hardware, such as various flip-flops, latches, in addition to other known memory or storage devices.

As shown in FIG. 3, a first region of the swizzled register svr0 is connected to a first region of the vector register vr0 via the swizzling network 301. A second region of the swizzled register svr0 is connected to the first region of the vector register vr0 via the swizzling network 301. In a similar way, the third and fourth regions of the swizzled virtual register svr0 are connected to a second region of the vector register vr0. Accordingly, when the vector register vr0 is enabled to store a data set having an order of a3, a2, a1, and a0, substantially simultaneously a data set is stored in the swizzled register svr0 having an order (e.g., a3, a3, a2, and a2) thereby creating the swizzle pattern "a3, a3, a2, and a2" with respect to the data set {a3, a2, a1, a0} stored in the vector register vr0.

Furthermore, the swizzled register svr1 stores a swizzle pattern corresponding to a result obtained by combining data elements from the vector register vr0 and data elements from the vector register vr1. For example, a first region of the swizzled register svr1 is connected to a first region of the vector register vr0 via the swizzling network 301. A second region of the swizzled register svr1 is connected to the second region of the vector register vr0 via the swizzling network 301. In a similar way, the third and fourth regions of the swizzled register svr1 are connected to the first and third regions of the vector register vr1, respectively. Accordingly, when the vector registers vr0 and vr1 are enabled to store data sets having orders of a3, a2, a1, and a0 and b3, b2, b1, and b0, substantially simultaneously a data set is stored in the swizzled register svr1 having an order (e.g., a0, a1, b0, and b1) thereby creating a swizzle pattern "a0, a1, b0, and b1" with respect to combining the data sets {a3, a2, a1, a0} and {b3, b2, b1, b0} stored in the vector register vr0 and vr1.

Therefore, when a vector processing unit requires or needs the result an executed swizzle instruction, a swizzle pattern stored in each of the swizzled registers 302a and 302b may be used instead of having the vector processing unit execute the swizzle instruction. As a result, overhead due to execution of a swizzle instruction is reduced or eliminated.

FIG. 4 illustrates another example of a swizzle pattern generator. The swizzle pattern generator illustrated in FIG. 4 does not utilize a physical storage device. Referring to FIG. 4, a swizzle pattern generator 400 includes a swizzling network 401 and virtual swizzled registers 402a and 402b.

The swizzled network 401 includes a plurality of data lines or wires, each having at least two ends. One end of each data line is connected to an output of a vector register and another end is "connected" to at least one of the virtual swizzled registers 402a and 402b. Unlike the example illustrated in FIG. 3, the virtual swizzled registers 402a and 402b are virtual registers (e.g., indicated in FIG. 4 by dotted lines) for purpose of illustrating this example and are not actual physical storage devices or spaces. That is, each of the virtual swizzled virtual registers 402a and 402b is formed by the combination of wires output from the swizzling network 401 with respect to the vector registers vr0 and vr1 connected to the input of the swizzling network 401.

As shown in FIG. 4, a first region of a virtual swizzled register svr0 is "connected" to a first region of a vector register vr0 via the swizzling network 401. A second region of the virtual swizzled register svr0 is "connected" to the first region of the vector register vr0 via the swizzling network 401. In a similar manner, the third and fourth regions of the virtual swizzled register svr0 are "connected" to the second region of the vector register vr0. Accordingly, when the vector register vr0 is enabled to store a data set having an order of a3, a2, a1, and a0, substantially simultaneously a data set is "stored" by the virtual swizzled register svr0 having an order (e.g., a3, a3, a2, and a2) thereby creating the swizzle pattern "a3, a3, a2, and a2" with respect to the data set {a3, a2, a1, and a0} stored in the vector register vr0.

Furthermore, the virtual swizzled register svr1 "stores" a swizzle pattern corresponding to a result obtained by combining data elements from the vector register vr0 and data elements from the vector register vr1. For example, a first region of the virtual swizzled register svr1 is "connected" to a first region of the vector register vr0 via the swizzling network 401. A second region of the virtual swizzled register svr1 is "connected" to the second region of the vector register vr0 via the swizzling network 401. In a similar way, the third and fourth regions of the virtual swizzled register svr1 are "connected" to the first and third regions of the vector register vr1, respectively. Accordingly, when the vector registers vr0 and vr1 are enabled to store data sets having an order of a3, a2, a1, and a0 and b3, b2, b1, and b0, substantially simultaneously a data set is "stored" in the virtual swizzled register svr1 having an order (e.g., a0, a1, b0, and b1) thereby creating a swizzle pattern "a0, a1, b0, and b1" with respect to combining the data sets {a3, a2, a1, a0} and {b3, b2, b1, b0} stored in the vector register vr0 and vr1.

Therefore, when a vector processing unit requires or needs the result of an executed swizzle instruction, a swizzle pattern "stored" in each of the virtual swizzled registers 402a and 402b may be used instead of having the vector processing unit execute the swizzle instruction. As a result, overhead due to execution of the swizzle instruction is reduced or eliminated.

Using the swizzle patterns described above as examples, a swizzle pattern frequently used by an application may be generated by logic supplied by hardware for a swizzle pattern that has been previously defined. However, when a processor executes a number of different applications where the frequently used swizzle pattern or patterns differ among the various applications, a swizzle pattern or patterns may be defined for each application prior to the execution of the application. Therefore, reconfigurable hardware may be used to provide logic for each application. One such example is described below with regard to FIG. 5.

Figure 5:
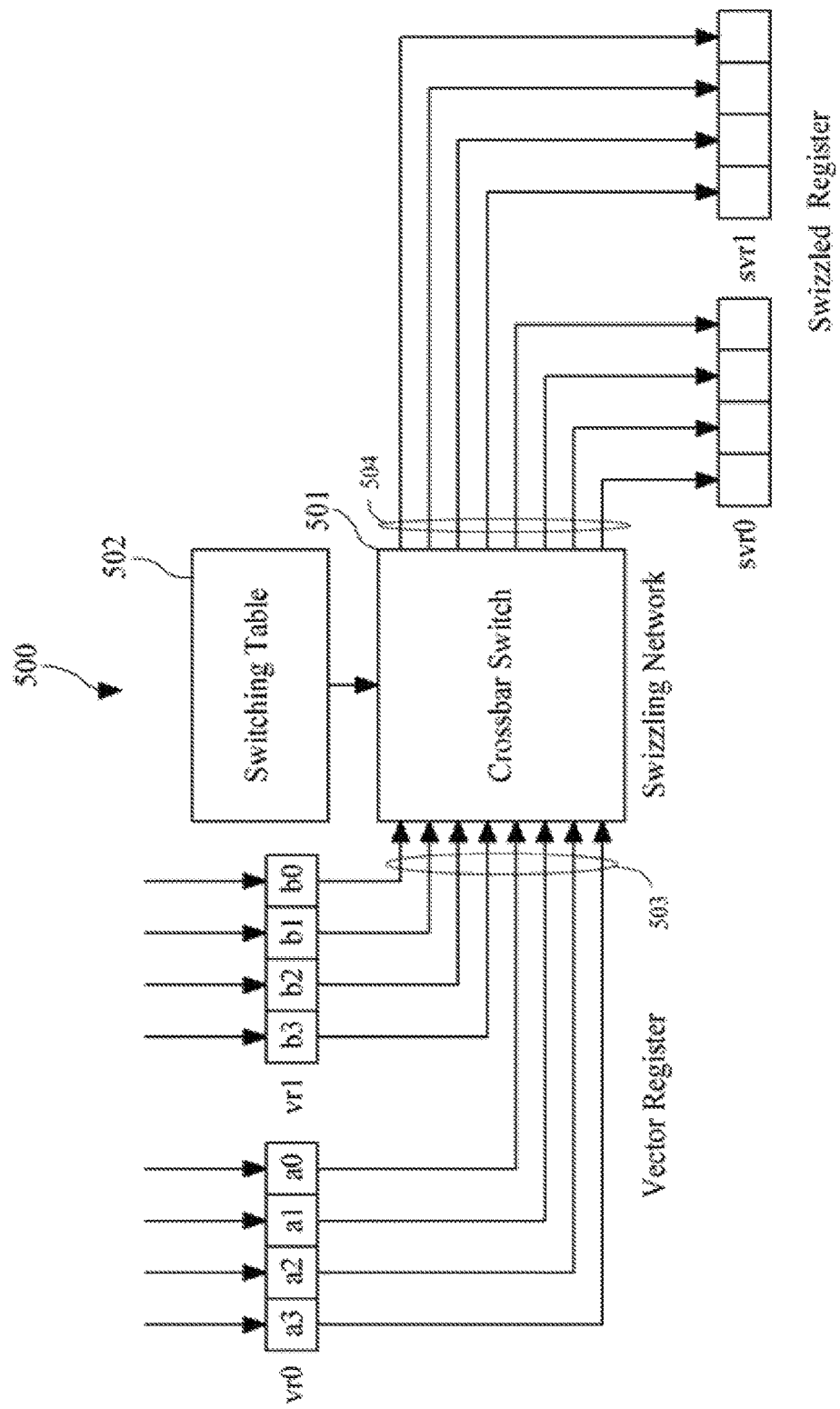
FIG. 5 is a diagram illustrating another example of a swizzle pattern generator.

FIG. 5 illustrates another example of a swizzle pattern generator. The swizzle pattern generator illustrated in FIG. 5 includes a reconfigurable swizzling network including, for example, a reconfigurable switching device allowing inputs and outputs of data connections of the switching device to be reconfigured according to instructions or input received from a corresponding controller, memory or other storage device.

For example, referring to FIG. 5, a swizzle pattern generator 500 includes a reconfigurable swizzling network. The reconfigurable swizzling network includes a reconfigurable switching device 501 and a controller/storage device 502 for the switching device. The switching device 501 includes a number of lead-in lines 503 and lead-out lines 504. The switching device 501 is a device that controls the connections between the various lead-in lines 503 and the lead-out lines 504. The switching device 501 may be used to generate an arbitrary or specific swizzle pattern for each application based on the connections of the switching device.

The controller/storage device 502 stores configuration information for the switching device 501 to configure the connections between the lead-in lines 503 and the lead-out lines 504 of the switching device. Under the assumption that the number of lead-in lines is m and the number of lead-out lines is n, the switching device 501 controls m×n different connections with m+n−1 control elements.

In one example, the switching device 501 may be implemented using a crossbar switch and the controller/storage device 502 may be implemented using a switching table. When the content of the switching table is changed, the connection state (i.e., the connections between the lead-in lines and the lead out lines) of the crossbar switch is changed. As a result, the swizzle patterns generated by the swizzle pattern generator may be altered simply by changing, storing, or loading a new switching table. Therefore, a frequently used swizzle pattern for each application may be stored using the switching table so that the swizzle pattern is generated when the corresponding application is executed.

Since frequently used swizzle patterns (hereinafter, referred to as a "swizzle pattern set") may be different by application, a reconfigurable swizzling network as shown in FIG. 5 may be used to enable a swizzled register corresponding to a swizzle pattern set for a different application. Applications using the same swizzle pattern set can share the same swizzle pattern. In addition, if swizzle patterns frequently used for one section of an application are different from swizzle patterns frequently used for other sections of the application, the application can use two or more swizzle pattern sets. In other words, in the course of executing the application, the reconfigurable swizzling network is reconfigured to generate a new swizzle pattern set. Therefore, a number of applications can share a swizzle pattern set (share a switching table), and one application can use different swizzle pattern sets (or switching tables) over time.

FIG. 6 illustrates an example an array block of a coarse grained array (CGA). In this example, the array block 600 includes inputs from a number of other array blocks (e.g., a, b, c, and d), a swizzle pattern generator 602, including a swizzling network 604 and a swizzled register file 606 (e.g., include eight swizzle patterns or registers), multiplexers (MUXs) 607 and 608, a vector processing unit (VPU) 609, and an output vector register 610. In this example, the swizzle pattern generator 602 is connected to the inputs of the CGA array block 600.

Referring to FIG. 6, inputs from a number of array blocks (e.g., arrays a, b, c, and d) are combined by the swizzle pattern generator 602 in units of data elements to form various swizzle patterns (e.g., a3, a2, b1, b1) via the swizzling network. The VPU 609 selects the inputs received from various array blocks and/or the swizzled registers as operands related to a vector operation. In FIG. 6, the VPU 609 receives a plurality of inputs to generate an output. One input selects one of the plurality of vector registers and the plurality of swizzled registers.

As shown in FIG. 6, outputs from the vector registers are inputted to the MUX 607 and 608 in an input side of the VPU 609, and are substantially simultaneously inputted to the swizzling network 604 to form swizzled registers. Outputs from the swizzled registers are inputted to the MUXs 607 and 608 in the input side of the VPU 609.

One of the vector registers and the swizzled registers is selected as an input to the VPU 609. In the example shown in FIG. 6, a swizzled register file 606 has eight swizzle registers. Outputs from all eight registers are available to the first input (left-side) of the VPU 609. In the example shown in FIG. 6, a configuration in which all vector registers and all swizzled registers can be the first inputs of the VPU 609. To simplify the drawing, the outputs from the remaining registers are represented as dots.

Figure 7:
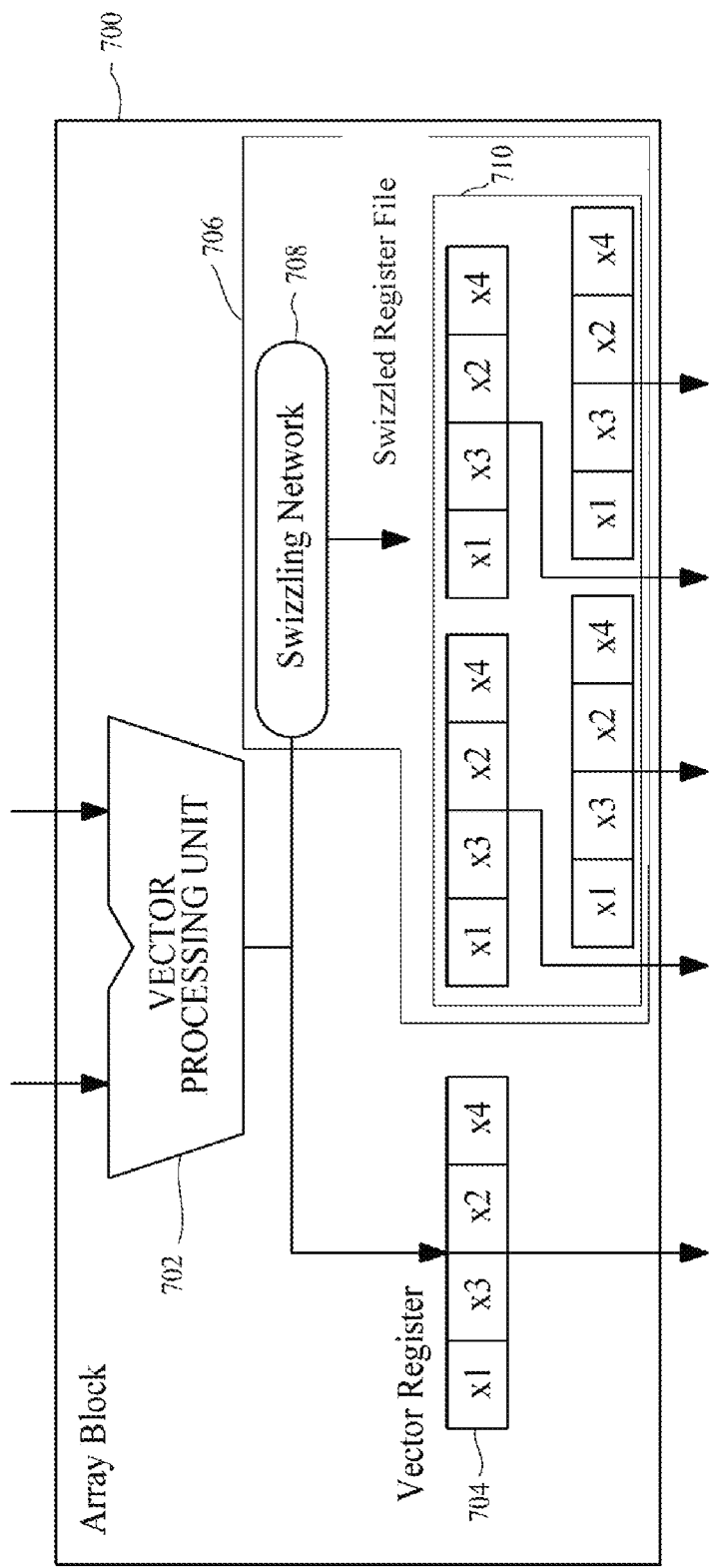
FIG. 7 is a diagram illustrating another example of a processing device that is applied to a CGA.

FIG. 7 illustrates another array block of a CGA. The array block 700 includes inputs, a vector processing unit 702, an output vector register 704, and a swizzle pattern generator 706 including a swizzling network 708 and a swizzled register file 710 (e.g., including four swizzle registers. In this example, the swizzle pattern generator is disposed between a vector register and an output of the CGA array block.

Referring to FIG. 7, it is appreciated that the output from the vector processing unit 702 is combined in units of data elements to form various swizzled patterns by the swizzle pattern generator 706. The vector register 704 stores the output from the vector processing unit 702 and the data elements stored by the vector register (e.g., x1, x3, x2, x4) may be combined to form swizzle patterns (e.g., x1, x3, x2, x4) by the swizzling network 708 of the swizzle generator 706. The swizzled virtual register file 710 may be used as an input of the corresponding array block, or may be sent to an output of the corresponding array block to be used as an input of another array block. Hereinafter, operations of the CGA blocks illustrated in FIGS. 6 and 7 are described in comparison with those of a general processor.

Figure 8A:
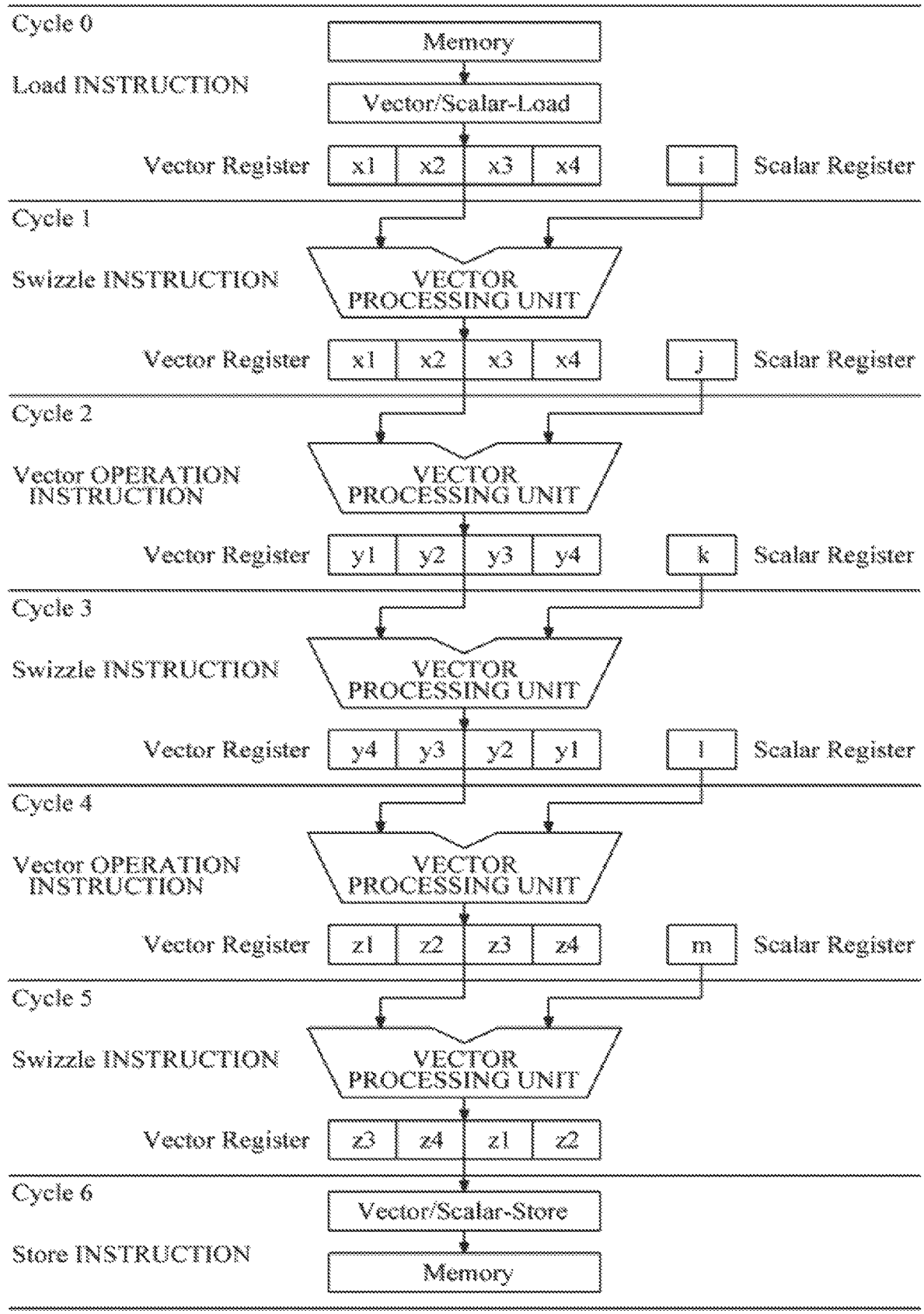
FIG. 8A is a diagram depicting an operation flow of a general processor processing two consecutive vector operations.

FIG. 8A shows an operation flow diagram of a general processor processing two consecutive vector operations. Referring to FIG. 8A, the general processor requires six cycles to process the two consecutive vector operations. In Cycle 0, a load instruction is performed to input a data set (e.g., {x1, x2, x3, x4}) from a memory to a vector register. In Cycle 1, a swizzle instruction is executed by the vector processing unit to determine a swizzle pattern (e.g., x1, x2, x3, x4) for the data set and the result is stored in the vector register. In Cycle 2, a vector operation instruction is executed by the vector processing unit and the result (e.g., y1, y2, y3, y4) is stored in the vector register. In Cycle 3, a swizzle instruction is executed by the vector processing unit to determine a swizzle pattern (e.g., y4, y3, y2, y1) which is stored in the vector register. In Cycle 4, a vector operation instruction is executed by the vector processing unit and the result (e.g., z1, z2, z3, z4) is stored in the vector register. In Cycle 5, a swizzle instruction is executed by the vector processing unit to determine a swizzle pattern (e.g., z3, z4, z1, z2) for the data set and the result is stored in the vector register. In Cycle 6, a store instruction reading the vector register is executed and the resulting data set is stored in the memory. A swizzle instruction is performed at execution of cycles 1, 3, and 5. Since the general processor executes three swizzle instructions for two vector operations, the general processor cannot consecutively perform the vector operations. As a result, the operational efficiency of the general processor decreases with the number of vector operation instructions performed.

Figure 8B:
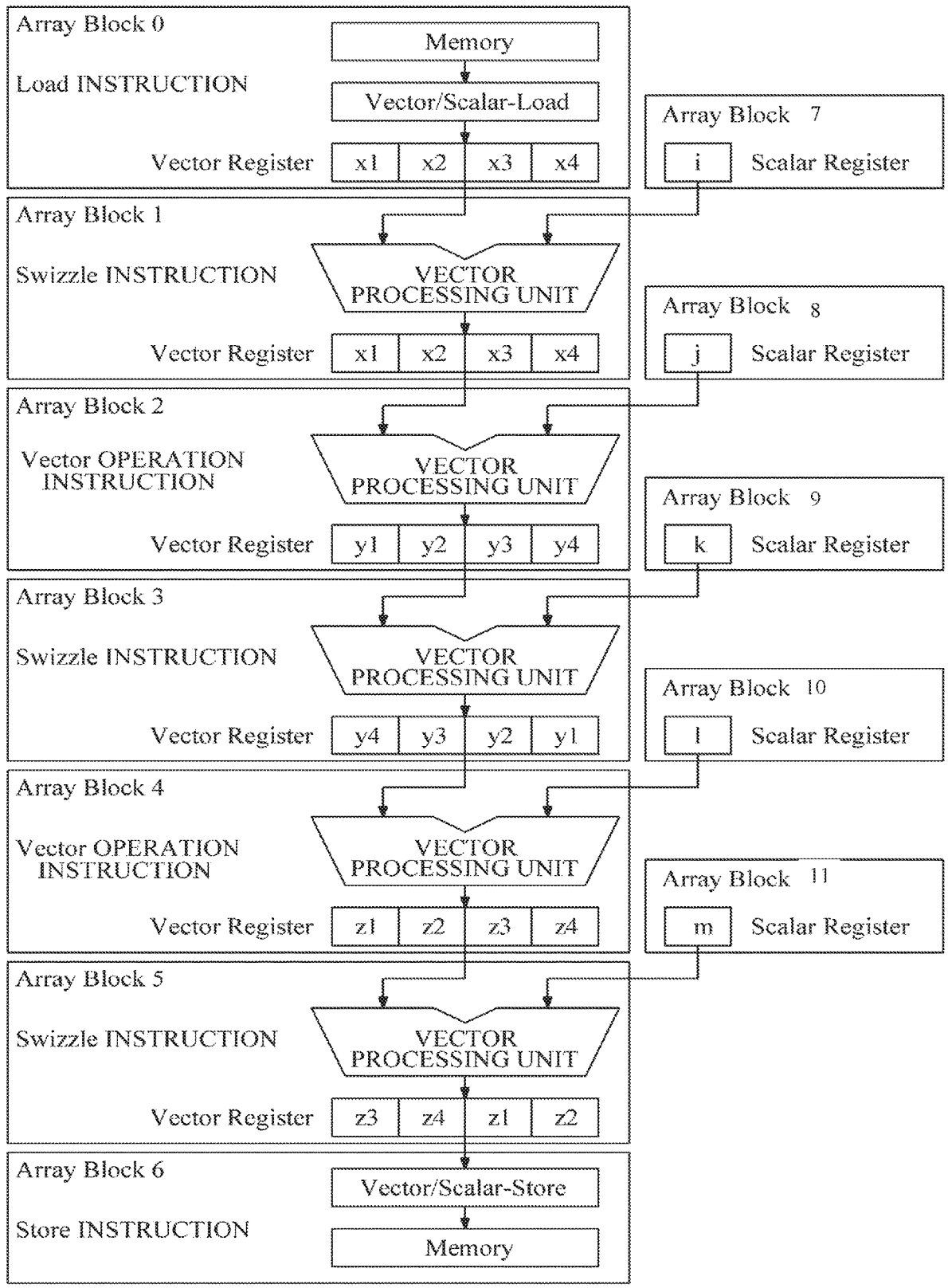
FIG. 8B is a diagram applying the operation flow from the example shown in FIG. 8A to a CGA.

FIG. 8B shows applying the example shown in FIG. 8A to a processor operation of a CGA. Referring to FIG. 8B, twelve array blocks of the CGA are shown.

Array Block 0 performs a load instruction from a memory for a data set (e.g., x1, x2, x3, x4) input to a vector register. Array Block 1 performs a swizzle instruction by the vector processing unit to determine a swizzle pattern (e.g., x1, x2, x3, x4) for the data set and stores the result in the vector register. Array Block 2 performs a vector operation instruction by the vector processing unit and stores the result (e.g., y1, y2, y3, y4) in the vector register. Array Block 3 performs a swizzle instruction by the vector processing unit to determine a swizzle pattern (e.g., y4, y3, y2, y1) which is stored in the vector register. Array Block 4 performs a vector operation instruction by the vector processing unit and stores the result (e.g., z1, z2, z3, z4) in the vector register. Array Block 5 performs a swizzle instruction by the vector processing unit to determine a swizzle pattern (e.g., z3, z4, z1, z2) for the data set and stores the result in the vector register. Array Block 6 performs a store instruction reading the vector register and storing the data set in the memory. Array Blocks 7-11 store a scalar register for input to the vector processing units of Array Blocks 1-5, respectively. As shown in FIG. 8B, the processor implemented by the CGA shown uses five vector processing units for two vector operations. That is, three of the five vector processing units of the array cannot perform a vector operation because they are performing a swizzle instruction instead.

Figure 9A:
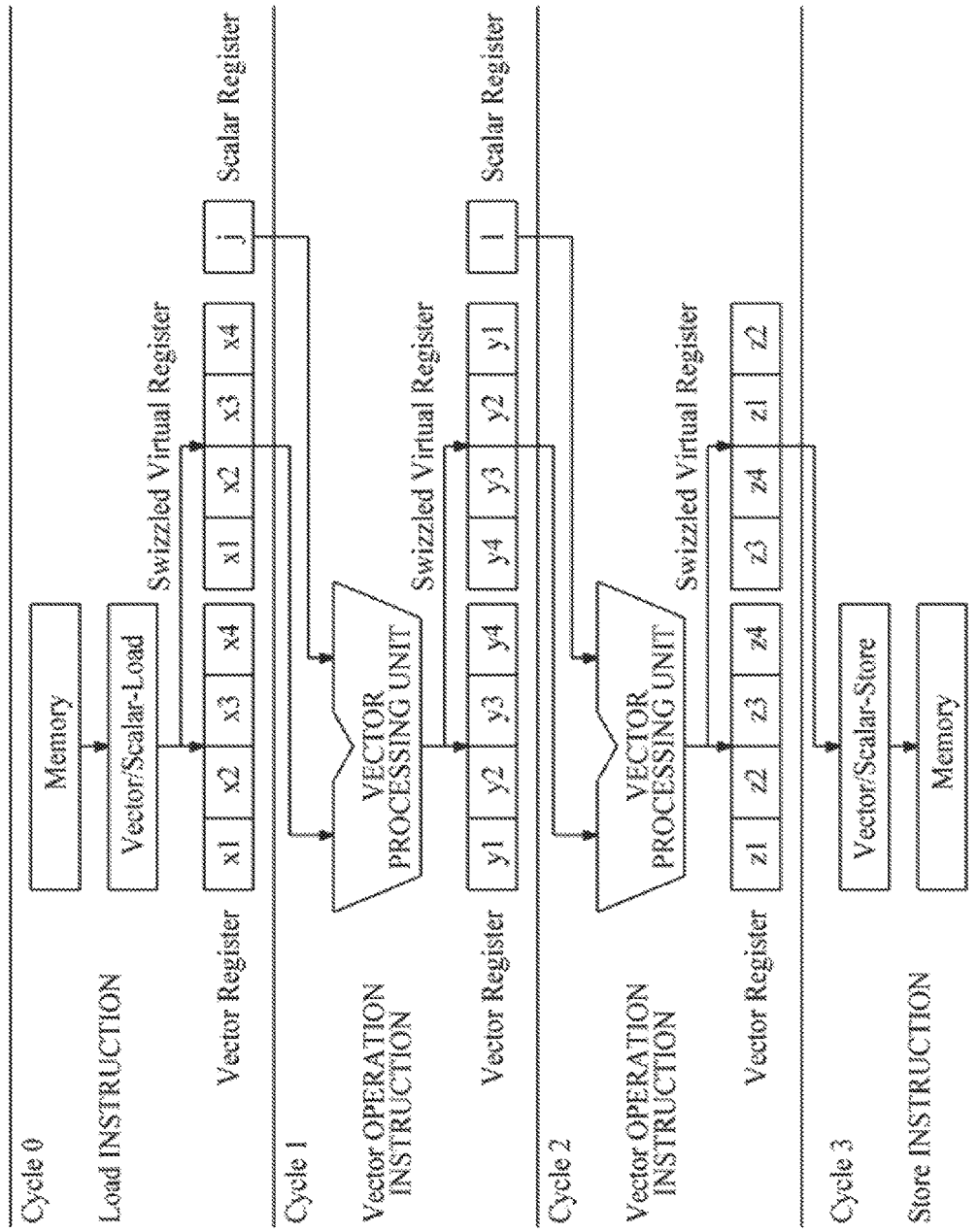
FIG. 9A is a diagram showing an operation flow to a processor using a swizzle pattern generator.

FIG. 9A shows a result obtained by applying the vector operations in the example with regard to the process flow shown in FIG. 8A to a processor implementing a swizzle pattern generator including a swizzled register.

Referring to FIG. 9A, the processor uses four cycles to process the two consecutive vector operations. In cycle 0, a load instruction inputs a data set (e.g., x1, x2, x3, x4) from a memory to a vector register and a swizzle pattern (e.g., x1, x2, x3, x4) for the data set is created by the swizzle pattern generator and the swizzle pattern is stored in the swizzled register. In Cycle 1, a vector operation instruction is executed by the vector processing unit, the result (e.g., y1, y2, y3, y4) is stored in the vector register, a swizzle pattern (e.g., y4, y3, y2, y1) is created by the swizzle pattern generator, and the result is stored in the swizzled register and provided as in input for cycle 2. In Cycle 2, a vector operation instruction is executed by the vector processing unit on the output swizzle pattern, the result (e.g., z1, z2, z3, z4) is stored in the vector register, a swizzle pattern (e.g., z3, z4, z1, z2) is created by the swizzle pattern generator, and the swizzle pattern is stored in the swizzled register. In Cycle 3, a store instruction reads the swizzled register and stores a data set corresponding to the swizzle pattern in the memory.

Referring to FIG. 9A, swizzle patterns corresponding to results of executing three swizzle instructions are stored in swizzled registers, so that it is possible to simply read out a data set of the swizzled register without executing a swizzle instruction.

Comparing FIG. 8A and FIG. 9A, after a vector operation is performed at cycle 2 of FIG. 8A, a swizzle instruction is executed for a subsequent vector operation at cycle 3. In marked contrast, in FIG. 9A a vector operation is performed at cycle 1, the vector operation result is stored in a vector register, and, at the same time, a predefined swizzle pattern is created and stored in a swizzled register for output. As a result, the output of cycle 1 is suitable as an input for immediate execution of a subsequent vector operation at cycle 2. Therefore, the number of processing cycles is reduced from six to four.

Figure 9B:
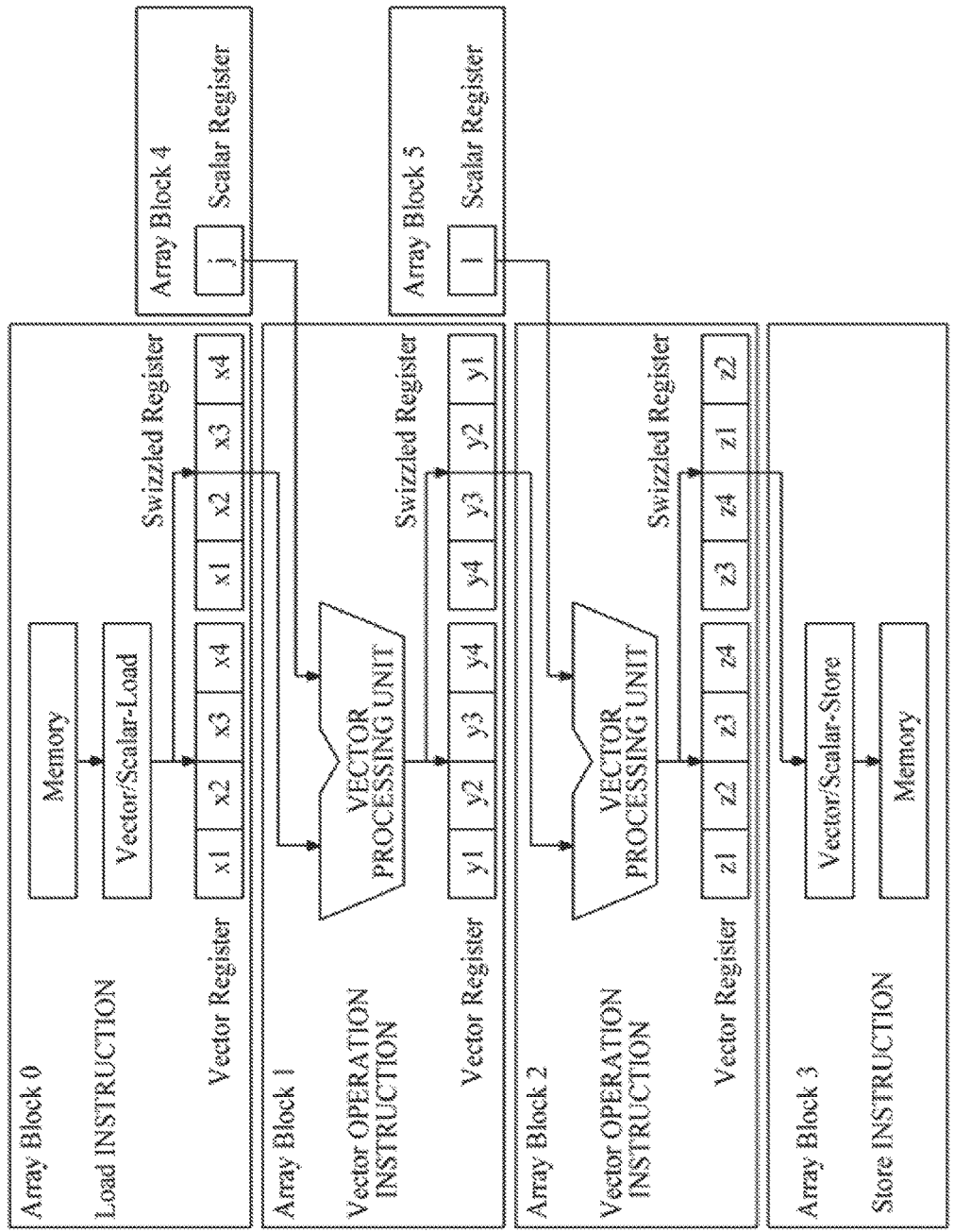
FIG. 9B is a diagram applying the operation flow from the example shown in FIG. 9A to a CGA.

Moreover, FIG. 9B illustrates a result obtained by applying the vector operations in the example with regard to the process flow shown in FIG. 8B to a processor implemented using a CGA with array blocks including a swizzle pattern generator and a swizzled register.

Referring to FIG. 9B, the CGA includes six array blocks to process the two consecutive vector operations. Array Block 0 performs a load instruction from a memory for a data set (e.g., x1, x2, x3, x4) input to a vector register and a swizzle pattern generator creates a swizzle pattern (e.g., x1, x2, x3, x4) for the data set which is stored in a swizzled register. Array Block 1 performs a vector operation instruction by the vector processing unit using the swizzle pattern read from the swizzed register of array block 0. The result (e.g., y1, y2, y3, y4) is stored in the vector register, and swizzle pattern generator creates a corresponding swizzle pattern (e.g., y4, y3, y2, y1) which is stored in the swizzled register. Array Block 2 performs a vector operation instruction by the vector processing unit using the swizzle pattern read from the swizzed register of array block 1. The result (e.g., z1, z2, z3, z4) is stored in the vector register and the swizzle pattern generator creates a corresponding swizzle pattern (e.g., z3, z4, z1, z2) which is stored in the swizzled register. Array Block 3 performs a store instruction reading the swizzled register of array block 2 and stores the data set in the memory. Array Blocks 4 and 5 store a scalar register for input to the vector processing units of Array Blocks 1 and 2, respectively, for the vector operations.

Comparing FIG. 8B and FIG. 9B, the array FIG. 9B does not require the additional vector processing units to perform swizzle instructions as shown in FIG. 8B. Therefore, the number of array blocks needed to perform the vector operations is reduced (e.g., from 13 to 5).

Therefore, according to this description, the same swizzle pattern that results from executing a swizzle instruction is simultaneously generated when a corresponding data set of a vector register is input or output without having a vector processing unit execute an actual swizzle instruction. Accordingly unnecessary overhead caused by executing swizzle instructions is reduced and processing performance is enhanced.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for executing swizzle instructions for vector operations, the apparatus comprising:
    a vector register configured to store a data set including data elements of a vector operation;
    a processor configured to perform the vector operation; and
    a swizzle pattern generator connected to the vector register and the processor, the swizzle pattern generator being configured to create a swizzle pattern with respect to the data set and being configured to create the swizzle pattern simultaneously upon input of the data set to the vector register,
    wherein the swizzle pattern generator comprises a swizzling network configured to create the swizzle pattern by combining data elements stored in different vector registers, a swizzled register configured to store the swizzle pattern, and the swizzling network comprising one or more data lines,
    wherein each data line connects an output of the processor to an input of the vector register and an input of the swizzled register,
    wherein the swizzling network comprises:
        a plurality of data lines that are reconfigurable to create various swizzle patterns;
        a switch including reconfigurable connections for each of the plurality of data lines configured to generate the various swizzle patterns based on the reconfigurable connections; and
        a switching table connected to the switch and configured to store various switch connections for the reconfigurable connections for the plurality of data lines corresponding to the various swizzle patterns.

2. The apparatus of claim 1, wherein the swizzle pattern generator is further configured to combine or change the order of the data elements of the data set to create the swizzle pattern.

3. The apparatus of claim 1, further comprising another vector register configured to store another data set including other data elements of the vector operation wherein the swizzle pattern generator is further connected to the other vector register and configured to combine the data elements of the data set and the other data elements of the other data set to create the swizzle pattern.

4. The apparatus of claim 3, wherein the swizzle pattern is input to the processor as a data set for the vector operation.

5. The apparatus of claim 1, wherein the swizzle pattern generator is further configured to create the swizzle pattern simultaneously upon output of the data set from the vector register.

6. The apparatus of claim 1, wherein the vector register and the swizzled register are configured to simultaneously store the output of the processor and the swizzle pattern of the swizzle generator, respectively.

7. A swizzle pattern generating apparatus comprising:
data connections, each configured to connect an output of a processor to an input of a swizzled network;
the swizzling network configured to generate swizzle patterns by combining data elements stored in different vector registers based on the data connections with respect to data sets output from the processor and configured to create the swizzle pattern simultaneously upon input of the data set to the vector register;
a vector register connected to the data connections and configured to store the data sets output from the processor; and
a swizzled register connected to an output of the swizzling network and configured to store data elements in an order corresponding to the swizzle patterns,
wherein the swizzling network comprises:
a reconfigurable switch configured to make the plurality of data connections to generate various swizzle patterns based on an arrangement of the data connections; and
a switching table connected to the switch and configured to store various arrangements of the data connections of the reconfigurable switch corresponding to the various swizzle patterns.

8. The apparatus of claim 7, wherein the plurality of data connections are reconfigurable to generate various arrangements of data connections and to generate various swizzle patterns corresponding to the various arrangements of data connections.

9. The apparatus of claim 8, wherein data elements output from the swizzling network provide at least one virtual swizzled register and swizzle patterns corresponding to the arrangement of the data connections and the output data element of each connection.

10. The apparatus of claim 8, further comprising at least one swizzled register connected to the plurality of data connections and configured to store data elements in an order corresponding to the various swizzle patterns.

11. The apparatus of claim 7, wherein data elements output from the swizzling network provide at least one virtual swizzled register and swizzle patterns corresponding to an arrangement of the output data elements.

12. The apparatus of claim 7, wherein the vector register and the swizzled register are configured to simultaneously store the outputs of the processor and the swizzle generator, respectively.

* * * * *